April 4, 1939.  L. G. S. BROOKER  2,153,169

PHOTOGRAPHIC EMULSION

Filed Aug. 13, 1936

α-(2-ethyl-1-benzothiazylidene-ethylidene)-benzoylacetonitrile

Fig. 1.

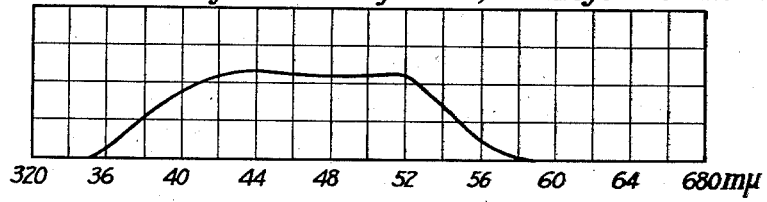

α-(1-ethyl-2-quinolylidene-ethylidene)-benzoylacetonitrile

Fig. 2.

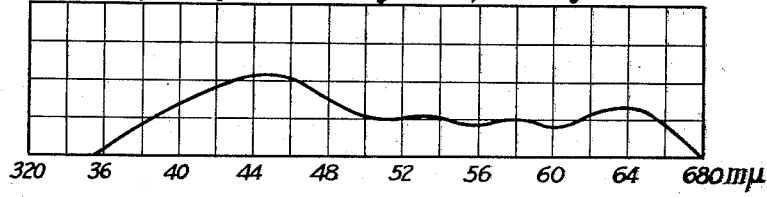

α-(2-ethyl-1-benzothiazylidene-ethylidene)-β-naphthoylacetonitrile

Fig. 3.

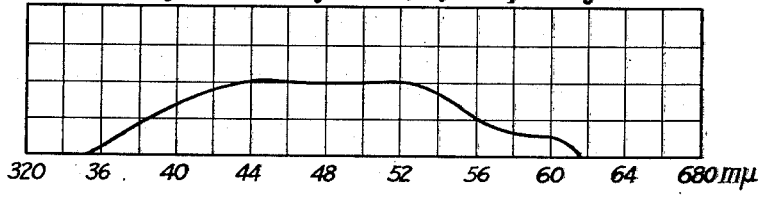

2-(γ,γ-diacetylallylidene)-1-ethyl-β-naphthothiazoline

Fig. 4.

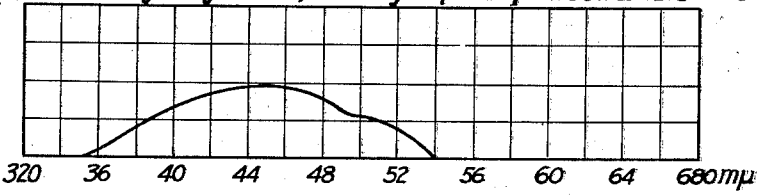

Carbethoxyformyl-(1-ethyl-2-β-naphthothiazylidene-ethylidene)-quinaldine

Fig. 5.

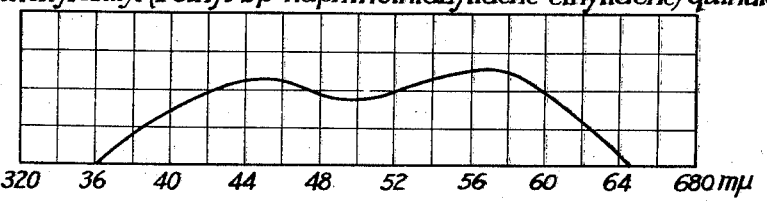

Leslie G. S. Brooker
INVENTOR.

BY

Newton N. Perrins
Daniel J. Mayne
ATTORNEYS

Patented Apr. 4, 1939

2,153,169

UNITED STATES PATENT OFFICE 2,153,169

PHOTOGRAPHIC EMULSION

Leslie G. S. Brooker, Rochester, N. Y., assignor, by mesne assignments, to Eastman Kodak Company, Jersey City, N. J., a corporation of New Jersey Application August 13, 1936, Serial No. 95,930
In Great Britain November 15, 1935

14 Claims. (Cl. 95—7)

This invention relates to dyes and to photographic emulsions containing the same. More particularly this invention relates to dyes which can be represented by the following general formula and to photographic silver salt emulsions containing the same:

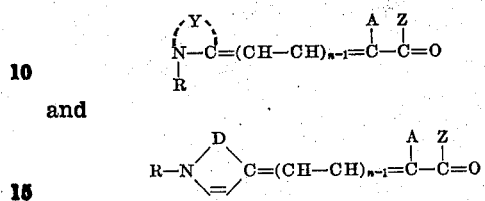

and

Wherein D represents a vinylene or phenylene group, $n$ represents a positive integer not less than two and not greater than three, R represents an alkyl group, A and Z each represent organic residues and Y represents the non-metallic atoms necessary to complete a five-membered or six membered heterocyclic nucleus. More particularly A can represent a cyano group, a carboxylic acid group, a carbalkoxy group, an acyl group or the like. Z can represent an acyl group, an aryl group, an alkylamino group, an arylamino group, a hydroxyl group, an alkoxyl group, a carboxyl group a carbalkoxy group or the like. The five-membered nucleus can be a thiazole, such as 4-methylthiazole, 4-phenylthiazole, benzothiazole, or naphthothiazole, a selenazole, such as 4-methylselenazole, 4-phenylselenazole or benzoselenazole, an oxazole nucleus, such as 4-methyloxazole, 4-phenyloxazole, benzoxazole or naphthoxazole, a pyridine, a quinoline, such as 5-methylquinoline or benzoquinoline, or an indolenine, such as a 3,3-dialkylindolenine, a thiazoline, or a selenazoline nucleus.

The dyes of my invention are in themselves new and can be prepared as hereinafter described. The dyes where $n$ represents two can be produced by condensing a cyclammonium quatenary salt, such as thiazole, a selenazole, an oxazole, a thiazoline, a selenazoline, a pyridine, a quinoline or an indolenine quaternary salt, containing a β-anilino-vinyl group in the alpha or gamma position, i. e. one of the so-called reactive positions, with a non-cyclic compound containing a nuclear reactive methylene group, e. g. one containing a nuclear methylene group adjacent to a nuclear carbonyl group, in the presence of an acid binding agent. The reaction can be illustrated by reference to the specific condensation of 1(β-anilinovinyl)-benzothiazole ethiodide with benzoylaceto-nitrile, in the presence of triethylamine:

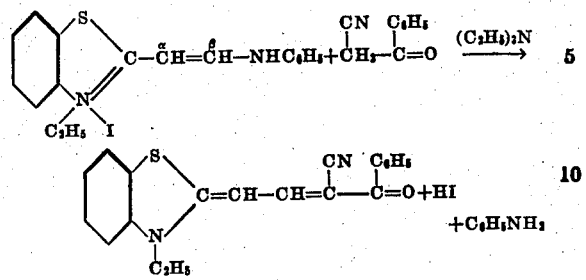

Such a dye is called α-(2-ethyl-1-benzothiazylidene - ethylidene) - benzoylacetonitrile. Acid-binding agents, such as strong tertiary organic bases, sodium or potassium hydroxide or carbonates or sodium or potassium alcoholates or sodium or potassium acetates can be used. Heat accelerates the process. I have found it advantageous to employ the acetylated β-anilino derivatives. In a manner similar to that illustrated above, malonic acid, pyruvic acid or their esters, naphthoylacetonitrile, cyanoacetamides, such as cyanocetanilide or N-methylcyanoacetamide, N-naphthylcyanoacetamide, acetylacetone, benzoylacetone or the like can be condensed with cyclammonium quaternary salts containing a β-anilinovinyl group. Quaternary salts such as alkyl halides, alkyl perchlorates, alkyl sulfates, alkyl-p-toluenesulfonates are suitable.

The following examples serve to illustrate the preparation of dyes wherein $n$ represents two. The examples are not intended to limit my invention.

*Example 1.—α-(2-ethyl-1-benzoxazylidene-ethylidene)-benzoylacetonitrile*

4.3 g. (1 mol.) of 1-(β-acetanilidovinyl) - benzoxazole ethiodide, 1.5 g. (1 mol.) of benzoylacetonitrile and 1.06 g. (1.05 mol.) of triethylamine were refluxed for about 15 minutes in 20 cc. of triethylamine. The dye separated from the cooled reaction mixture. After recrystallization from methyl alcohol the dye was obtained as minute canary yellow crystals. The dye has the following formula:

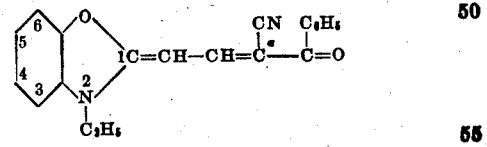

*Example 2.*—α-(1-ethyl-2-quinolylidene-ethylidene)-benzoylacetonitrile 2.2 g. (1 mol.) of 2-(β-acetanilidovinyl)-quinoline ethiodide, 0.75 g. (1 mol.) of benzoylacetonitrile and 0.45 g. (1.1 mol.) of sodium acetate were refluxed in 20 cc. of acetic anhydride for about 5 minutes. The dye separated from the chilled solution. After recrystallization from glacial acetic acid, the dye was obtained as reddish purple crystals. The dye has the following formula:

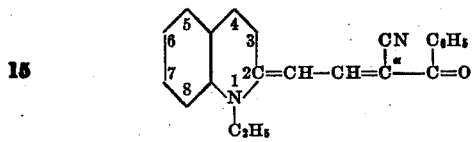

*Example 3.*—α-(2-ethyl-1-benzothiazylidene-ethylidene)-cyanoacetanilide 2.25 g. (1 mol.) of 1-(β-acetanilidovinyl)-benzothiazole ethiodide, 0.8 g. (1 mol.) of cyanoacetanilide and 2.5 g. (1 mol.) of triethylamine were refluxed by about 15 minutes in 20 cc. absolute ethyl alcohol. The dye separated from the cooled reaction mixture. After recrystallization from glacial acetic acid, the dye was obtained as orange brown prisms which had a blue reflex. The dye has the following formula:

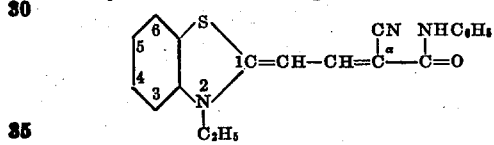

*Example 4.*—(2-ethyl-1-benzothiazylidene-ethylidene)-β-naphthoylacetonitrile 1.13 g. (1 mol.) of 1-(β-acetanilidovinyl)-benzothiazole ethiodide, 0.5 g. (1 mol.) of β-naphthoylacetonitrile and 0.29 g. (1.15 mol.) were refluxed in 20 cc. of absolute ethyl alcohol for about 5 minutes. The dye separated from the cooled reaction mixture. After recrystallization, the dye was obtained as red crystals having a blue-green reflex. The dye has the following formula:

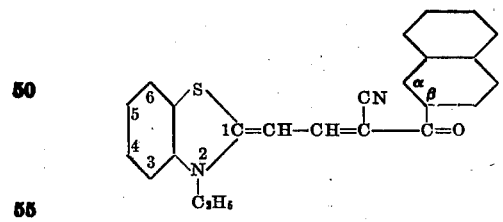

In a similar manner α-(2-ethyl-1-benzothiazylidene-ethylidene)-benzoylacetonitrile and (2-ethyl-1-benzoxazylidene-ethylidene)-β-naphthoylacetonitrile were prepared. Carbethoxyformyl-[1-ethyl-2-(β-naphthothiazylidene)-ethylidene]-quinaldine can be similarly prepared from ethyl-2-quinolylpyruvate. The dye was obtained in the form of reddish brown needles melting at 184–186° C. with decomposition. The dye has the following formula:

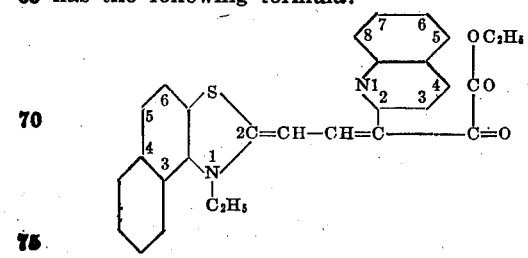

2-(γ,γ-diacetylallylidene)-1-ethyl-β-naphthothiazoline can be similarly prepared from acetylacetone. The dye was obtained in the form of orange needles melting at 195–197° C. with decomposition. The dye has the following formula:

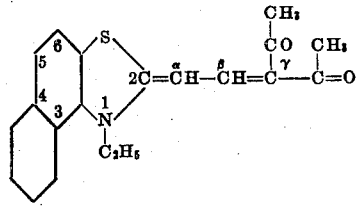

The dyes where n represents three can be prepared by condensing a cyclammonium quaternary salt, such as a thiazole, a selenazole, an oxazole, a thiazoline, a selenazoline, a pyridine, a quinoline or an indolenine quatenary salt, containing an ω-anilino-Δ1, 3-butadienyl group in the alpha or gamma position, i. e. one of the so-called reactive positions, with a non-cyclic compound containing a nuclear reactive methylene group, e. g. one containing a nuclear methylene group adjacent to a nuclear carbonyl group, in the presence of an acid-binding agent. The reaction can be illustrated by reference to the specific condensation of 1-(ω-acetanilido-Δ1, 3-butadienyl)-benzothiazole ethiodide with cyano-acetanilide, in the presence of triethylamine.

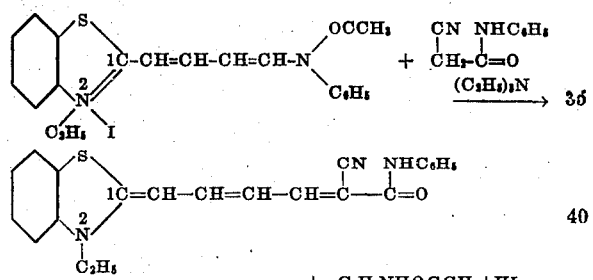

$+ C_6H_5NHOCCH_3+HI$

Such a dye is called (2-ethyl-1-benzothiazylidene-butenylidene)-cyanoacetanilide. Acid-binding agents as indicated above for the ethylidene derivatives are also suitable for the butenylidene derivatives. Heat accelerates the process. I have found it advantageous to use the acetylated ω-anilino-Δ1, 3-butadienyl derivatives. ω-anilino-γ-bromo-Δ1, 3-butadienyl derivatives can be used. In a manner similar to that illustrated above, malonic acid, pyruvic acid or their esters, naphthoylacetonitrile, cyanoacetamides, such as cyanoacetanilide or N-methyl-cyanoacetamide, acetylacetone, benzoyl-acetone or the like can be condensed with cyclammonium quaternary salts containing an ω-anilino-Δ1, 3-butadienyl group. Quaternary salts such as alkyl halides, alkylsulfates, alkyl perchlorates, alkyl p-toluenesulfanates are suitable.

The following examples serve to illustrate the preparation of dyes wherein n represents three. These examples are not intended to limit my invention.

*Example 5.*—α-(2-ethyl-1-benzothiazylidene-butenylidene)-benzoyl-acetonitrile 1-(ω-acetonilido-Δ1, 3-butadienyl)-benzothiazole ethiodide was prepared by refluxing 1-methylbenzothiazole ethiodide (1 mol.) with β-anilinoacrolein anilhydrochloride (1 mol.) in acetic anhydride for one hour. The cooled reaction mixture was allowed to stand over night at about 0°. After diluting with 2½ times its volume of ether, the dark brown residue which separated was stirred with chilled ethyl alcohol, filtered and dried.

1.2 g. (1 mol.) of 1-(ω-acetanilido-Δ-1,3-butadienyl)-benzothiazo ethiodide, 0.35 g. (1 mol.) of benzoylacetonitrile and 0.25 g. (1 mol.) of triethylamine were refluxed for about 10 minutes in absolute ethyl alcohol (10 cc.). The dye separated from the chilled solution. After recrystallization from 95% ethyl alcohol, the dye was obtained as minute blue crystals. The dye has the following formula:

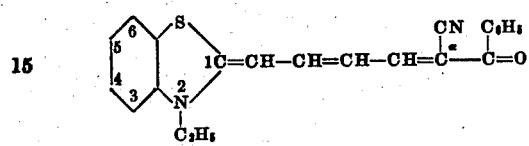

*Example 6.*—α-(2-ethyl-1-benzoxazylidene-butenylidene)-cyanoacetanilide 1.15 g. (1 mol.) of 1-(ω-acetanilido-Δ-1,3-butadienyl)-benzoxazole ethiodide (prepared as indicated in the above example), 0.4 g. (1 mol.) of cyanoacetanilide and 0.25 g. (1 mol.) of triethylamine were refluxed in 10 cc. absolute ethyl alcohol for about 10 minutes. The dye separated from the cooled reaction mixture. After recrystallization from 95% ethyl alcohol, the dye was obtained as dull blue gray crystals with double blue and green reflex. The dye has the following formula:

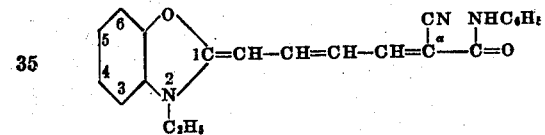

In a similar manner α-(2-ethyl-1-benzoxazylidene-butenylidene)-benzoyl-acetonitrile and α-(2-ethyl-1-benzothiazylidene-butenylidene)-cyanoacetanilide were prepared.

These new dyes show a novel sensitizing action in photographic silver salt emulsions, particularly silver chloride and silver bromide emulsions. Accordingly, my invention is particularly directed to the customarily employed silver halide emulsions. However, the light-sensitive material employed in the emulsions of my invention can be any light-sensitive silver salt alone or combined with another light-sensitive salt, such as a silver halide. My invention is further particularly directed to the customarily employed gelatin emulsions, gelating being the carrier or medium in which the light-sensitive salt is suspended. However, any other suitable carrier, such as a cellulose derivative or a synthetic resin, which has substantially no desensitizing effect on the silver salt, can be used.

The sensitizing action of these new dyes will be illustrated with particular reference to silver bromide emulsions. Fig. 1 depicts diagrammatically the sensitizing action of α-(2-ethyl-1-benzothiazylidene-ethylidene)-benzoylacetonitrite in a bromide emulsion; Fig. 2 α-(1-ethyl-2-quinolylidene-ethylidene)-benzoylacetonitrite in a bromide emulsion; Fig. 3 α-(2-ethyl-1-benzothiazylidene-ethylidine)-β-naphthoylacetonitrite; Fig. 4 2-(γ,γ-diacetylallylidene)-1-ethyl-β-naphthothiazoline in a bromide emulsion and Fig. 5 carbethoxyformyl-(1-ethyl-2-β-naphtholthiazylidene-ethylidene)-quinaldine in a bromide emulsion. Some of the herein disclosed dyes have small desensitizing effects together with sensitizing effects in another range of the spectrum.

The nuclei of the dyes may be substituted by methyl, chloro, alkoxyl, amino or the like groups.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentrate for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol acetone or pyridin and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting my invention in any sense, as it will be apparent that these dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to dry.

It is to be understood that the herein disclosed dyes probably exit in two forms illustrated as follows:

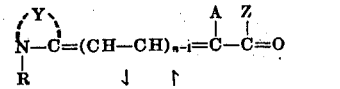

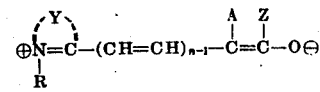

As illustrated these forms are interconvertible one into the other, i. e., the forms are virtual tautomers.

What I claim as my invention and desire to be secured by Letters Patent of the United States is:

1. A photographic silver halide emulsion containing a sensitizing dye selected from the group of dyes characterized by one of the following two formulas:

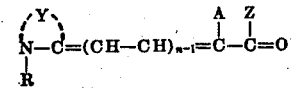

and

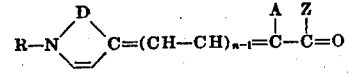

wherein D represents a radical selected from the group consisting of vinylene and phenylene groups, n represents a positive integer not smaller than two and not greater than three, R represents an alkyl group, Y represents the non-metallic atoms necessary to complete a heterocyclic nucleus selected from the group consisting of five-membered and six-membered heterocyclic nuclei, A represents a cyano group when Z represents a member selected from the group consisting of aryl groups and arylamino groups, A represents an acyl group when Z represents a member selected from the group consisting of alkyl and aryl groups and A represents a quinolyl group when Z represents a carbalkoxy group.

2. A photographic gelatino-silver-halide emulsion containing a sensitizing dye selected from the group of dyes characterized by one of the following two formulas:

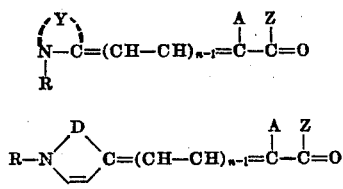

and wherein D represents a radical selected from the group consisting of vinylene and phenylene groups, n represents a positive integer not smaller than two and not greater than three, R represents an alkyl group, Y represents the non-metallic atoms necessary to complete a heterocyclic nucleus selected from the group consisting of five-membered heterocyclic nuclei, A represents a cyano group when Z represents a member selected from the group consisting of aryl groups and arylamino groups, A represents an acyl group when Z represents a member selected from the group consisting of alkyl and aryl groups and A represents a quinolyl group when Z represents a carbalkoxy group.

3. A photographic gelatino-silver-halide emulsion containing a sensitizing dye selected from the group of dyes characterized by the following formula:

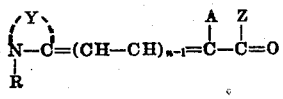

when n represents a positive integer not smaller than two and not greater than three, R represents an alkyl group, Y represents the non-metallic atoms necessary to complete a heterocyclic nucleus selected from the group consisting of five-membered and six-membered heterocyclic nuclei, A represents a cyano group when Z represents a member selected from the group consisting of aryl and arylamino groups, A represents an acyl group when Z represents a member selected from the group consisting of alkyl and aryl groups and A represents a quinolyl group when Z represents a carbalkoxy group.

4. A photographic gelatino silver halide emulsion containing a sensitizing dye selected from group of dyes characterized by the following formula:

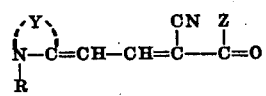

wherein R represents an alkyl group, Y represents the non-metallic atoms necessary to complete a benzothiazole nucleus, and Z represents an aryl group.

5. A photographic gelatino silver halide emulsion containing a sensitizing dye selected from group of dyes characterized by the following formula:

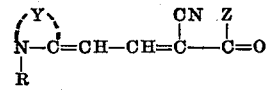

wherein R represents an alkyl group, Y represents the non-metallic atoms necessary to complete a benzothiazole nucleus, and Z represents a phenyl group.

6. A photographic gelatino silver halide emulsion containing a sensitizing dye selected from group of dyes characterized by the following formula:

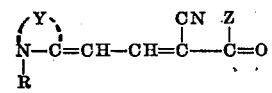

wherein R represents an alkyl group, Y represents the non-metallic atoms necessary to complete a benzothiazole nucleus, and Z represents a naphthyl group.

7. A photographic gelatino silver halide emulsion containing a sensitizing dye selected from group of dyes characterized by the following formula:

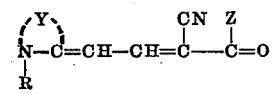

wherein R represents an alkyl group, Y represents the non-metallic atoms necessary to complete a benzothiazole nucleus, and Z represents an arylamino group.

8. A photographic gelatino silver halide emulsion containing a sensitizing dye selected from group of dyes characterized by the following formula:

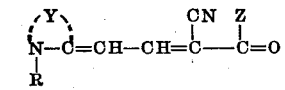

wherein R represents an alkyl group, Y represents the non-metallic atoms necessary to complete a benzothiazole nucleus, and Z represents a phenylamino group.

9. A photographic gelatino silver halide emulsion sensitized with α-(2-ethyl-1-benzothiazylidene-ethylidene)-benzoylacetonitrile.

10. A photographic gelatino silver halide emulsion sensitized with (2-ethyl-1-benzothiazylidene-ethylidene)-β-naphthoylacetonitrile.

11. A photographic gelatino silver halide emulsion sensitized with α-(2-ethyl-1-benzothiazylidene-ethylidene)-cyanoacetanilide.

12. A photographic gelatino-silver-halide emulsion containing a sensitizing dye selected from the group of dyes characterized by the following formula:

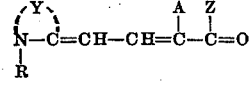

wherein R represents an alkyl group, Y represents the non-metallic atoms necessary to complete a heterocyclic nucleus selected from the group consisting of five-membered and six-membered heterocyclic nuclei, A represents a cyano group when Z represents a member selected from the group consisting of aryl and arylamino groups, A represents an acyl group when Z represents a member selected from the group consisting of alkyl and aryl groups and A represents a quinolyl group when Z represents a carbalkoxy group.

13. A photographic gelatino-silver-halide emulsion containing a sensitizing dye selected from the group of dyes characterized by the following formula:

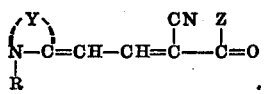

wherein R represents an alkyl group, Y represents the non-metallic atoms necessary to complete an azole nucleus and Z represents an aryl group.

14. A photographic gelatino-silver-halide emulsion containing a sensitizing dye selected from the group of dyes characterized by the following formula:

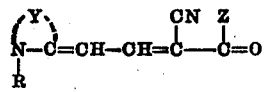

wherein R represents an alkyl group, Y represents the non-metallic atoms necessary to complete an azole nucleus and Z represents an arylamino group.

LESLIE G. S. BROOKER.